(12) United States Patent
Cohen (10) Patent No.: US 10,188,120 B2
(45) Date of Patent: *Jan. 29, 2019

(54) MULTIPLE DRAWER SMOKER

(71) Applicant: LANDMANN USA, Fairburn, GA (US)

(72) Inventor: Jared I. Cohen, Fairburn, GA (US)

(73) Assignee: LANDMANN USA, Fairburn, GA (US)

( * ) Notice: Subject to any disclaimer, the term of this patent is extended or adjusted under 35 U.S.C. 154(b) by 519 days.

This patent is subject to a terminal disclaimer.

(21) Appl. No.: 14/573,226

(22) Filed: Dec. 17, 2014

(65) Prior Publication Data

US 2015/0132456 A1   May 14, 2015

Related U.S. Application Data

(63) Continuation-in-part of application No. 13/098,145, filed on Apr. 29, 2011, now Pat. No. 8,939,068.

(60) Provisional application No. 61/329,149, filed on Apr. 29, 2010.

(51) Int. Cl.
   *A23B 4/044*   (2006.01)
   *A23B 4/052*   (2006.01)

(52) U.S. Cl.
   CPC ............ *A23B 4/0523* (2013.01); *A23B 4/044* (2013.01); *A23B 4/052* (2013.01); *Y02A 40/949* (2018.01)

(58) Field of Classification Search
   CPC ......... A23B 4/044; A23B 4/048; A23B 4/052; A23B 4/0523; A23B 4/0526
   USPC .................................................... 99/482, 481
   See application file for complete search history.

(56) References Cited

U.S. PATENT DOCUMENTS

| | | | |
|---|---|---|---|
| 3,316,831 A | 5/1967 | Koland et al. | |
| 3,355,573 A | 11/1967 | Wilson | |
| 3,477,360 A | 11/1969 | Raney | |
| 3,776,127 A | 12/1973 | Muse | |
| 3,882,767 A | 5/1975 | Oyler et al. | |
| 4,094,295 A | 6/1978 | Boswell et al. | |
| 4,233,890 A | 11/1980 | Jansen | |
| 4,455,924 A | 6/1984 | Wenzel | |
| 4,467,709 A * | 8/1984 | Anstedt | A23B 4/0523 126/25 R |
| 4,471,748 A | 9/1984 | Venable | |
| 4,474,107 A * | 10/1984 | Cothran | A23B 4/052 426/314 |
| 4,721,037 A | 1/1988 | Blosnich | |

(Continued)

FOREIGN PATENT DOCUMENTS

FR          2597722   * 10/1987 ............. A23B 4/052

OTHER PUBLICATIONS

Operator's Manual for "Liquid Propane Gas Smoker"; Model MSM06ALP; Member's Mark; Oct. 11, 2005; Manual # P80158004A; pp. 1-17.

*Primary Examiner* — Reginald L Alexander
(74) *Attorney, Agent, or Firm* — McClure, Qualey & Rodack, LLP (57) ABSTRACT

Disclosed herein is a smoker with multiple separate drawers for smoking meat, fish, sausage, etc. In an example embodiment, one drawer may contain water and another drawer may contain smoking material such as wood chips. The sliding drawers enable the maintenance of a stable smoking temperature and offer a safer means to replenish water and/or wood during the actual smoking operation. The multiple drawers allow a user to add wood and/or water without opening the smoking chamber.

12 Claims, 7 Drawing Sheets

(56) References Cited

U.S. PATENT DOCUMENTS

| | | |
|---|---|---|
| 4,757,756 A | 7/1988 | Van Marr |
| 4,924,071 A | 5/1990 | Jacobs |
| 5,078,049 A | 1/1992 | Glanton |
| 5,704,278 A | 1/1998 | Cross |
| 5,891,498 A | 4/1999 | Boehler |
| 6,012,382 A | 1/2000 | McLemore |
| 6,029,566 A | 2/2000 | McLemore |
| 6,039,039 A * | 3/2000 | Pina, Jr. ............... A23B 4/052 126/25 R |
| 6,289,795 B1 | 9/2001 | McLemore et al. |
| 6,626,090 B2 | 9/2003 | McLemore et al. |
| 6,708,604 B1 | 3/2004 | Deichler, Jr. |
| 6,711,992 B1 | 3/2004 | McLemore |
| 6,742,446 B2 | 6/2004 | McLemore et al. |
| 6,913,011 B1 | 7/2005 | Snider |
| 6,941,857 B2 | 9/2005 | McLemore |
| D516,374 S | 3/2006 | McLemore |
| D520,802 S | 5/2006 | McLemore et al. |
| 7,227,107 B2 | 6/2007 | McLemore et al. |
| D560,424 S | 1/2008 | McLemore |
| 7,426,885 B2 | 9/2008 | McLemore et al. |
| 7,451,691 B2 | 11/2008 | Robertson |
| 7,665,663 B2 | 2/2010 | Hoffer et al. |
| 7,703,386 B1 | 4/2010 | Bourgeois et al. |
| 7,703,389 B2 | 4/2010 | McLemore et al. |
| D615,798 S | 5/2010 | McLemore et al. |
| D616,243 S | 5/2010 | McLemore et al. |
| D625,545 S | 10/2010 | McLemore et al. |
| D629,244 S | 12/2010 | McLemore et al. |
| 7,861,705 B2 | 1/2011 | Hulsey |
| 2002/0040644 A1 | 4/2002 | McLemore et al. |
| 2003/0005828 A1 | 1/2003 | McLemore et al. |
| 2004/0103795 A1 | 6/2004 | McLemore |
| 2005/0121020 A1 | 6/2005 | McLemore et al. |
| 2005/0276892 A1 | 12/2005 | McLemore |
| 2006/0091137 A1 | 5/2006 | McLemore et al. |
| 2006/0137543 A1 | 6/2006 | McLemore et al. |
| 2006/0254432 A1 | 11/2006 | McLemore |
| 2008/0233257 A1 | 9/2008 | McLemore et al. |
| 2009/0078127 A1 | 3/2009 | McLemore et al. |
| 2009/0087534 A1 | 4/2009 | McLemore |
| 2009/0199839 A1 | 8/2009 | Hulsey |
| 2009/0320862 A1 | 12/2009 | Averwater |
| 2010/0206287 A1 | 8/2010 | McLemore et al. |
| 2011/0081471 A1 | 4/2011 | McLemore et al. |
| 2011/0268853 A1 | 11/2011 | Cohen |

* cited by examiner

610 — PROVIDING A SMOKING CABINET FOR SMOKING ARTICLES, THE CABINET COMPRISING A SMOKING CHAMBER; AT LEAST A FIRST DRAWER LOCATED PROXIMATELY BENEATH THE SMOKING CABINET, THE FIRST DRAWER CONFIGURED TO HOLD A LIQUID; AND AT LEAST A SECOND DRAWER LOCATED PROXIMATELY BENEATH THE FIRST DRAWER, THE SECOND DRAWER CONFIGURED TO HOLD A SMOKING MATERIAL

620 — HEATING THE SMOKING CABINET WITH A HEATING SOURCE LOCATED PROXIMATELY BENEATH THE SECOND DRAWER

FIG. 7

MULTIPLE DRAWER SMOKER

CROSS-REFERENCE TO RELATED APPLICATION

This is a continuation-in-part application of U.S. application Ser. No. 13/098,145, filed Apr. 29, 2011, which claims benefit to U.S. provisional patent application Ser. No. 61/329,149, filed on Apr. 29, 2010, which is incorporated by reference herein.

TECHNICAL FIELD

The present disclosure is generally related to cooking and, more particularly, is related to outdoor smokers.

BACKGROUND

To smoke foods, a user needs a container to hold in the smoke, a source of heat, a source of the smoke, and some food to smoke. The source of the smoke may be hardwood. The process of smoking has grown around cuts of meat that traditionally don't come out well with any other cooking method. A good example of this is brisket, which is very tough and not very easy to eat unless it is cooked very slowly at a low temperature. Proper temperature control is important. Meat smoking is best done in the range of 225-250 degrees F. To be safe most meats need to be cooked to an internal temperature of 145 degrees F. and poultry to 165 degrees F. In most smokers, a heat source is required to produce moisture heat and to produce the smoke. There are heretofore unaddressed needs with outdoor smoker systems and methods.

SUMMARY

Example embodiments of the present disclosure provide a multiple drawer smoker. Briefly described, in architecture, one example embodiment of the smoker, among others, can be implemented as follows: a smoking cabinet comprising: a smoking chamber; and multiple drawers located proximately beneath the smoking chamber, each drawer configured to provide access to an item used to produce smoke for the smoking chamber; and a heating element located proximately beneath the multiple drawers.

Embodiments of the present disclosure can also be viewed as providing methods of smoking. In this regard, one embodiment of such a device, among others, can be broadly summarized by the following: providing a smoking cabinet for smoking articles, the cabinet comprising: a smoking chamber; at least a first drawer located proximately beneath the smoking cabinet, the first drawer configured to hold a liquid; at least a second drawer located proximately beneath the first drawer, the second drawer configured to hold a smoking material; and heating the smoking cabinet with a heating source located proximately beneath the second drawer.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Disclosed herein is a multiple drawer smoker. More specifically, this disclosure provides a smoker with multiple separate drawers for smoking meat, fish, sausage, etc. In an example embodiment, one drawer may contain water and another drawer may contain smoking material such as wood chips. Embodiments of this disclosure may be embodied in many different forms and should not be construed as limited to the embodiments set forth herein. The examples set forth herein are non-limiting examples and are merely examples among other possible examples.

To smoke foods, a user needs a container to hold in the smoke, a source of heat, a source of the smoke, and some food to smoke. The source of the smoke may be hardwood as a non-limiting example. The process of smoking has grown around cuts of meat that traditionally don't come out well with any other cooking method. A good example of this is brisket, which is very tough and not very easy to eat unless it is cooked very slowly at a low temperature. Proper temperature control is important. Meat smoking is best done in the range of 225-250 degrees F. To be safe most meats need to be cooked to an internal temperature of 145 degrees F. and poultry to 165 degrees F. Example embodiments of the multiple drawer smoker disclosed herein provide sliding drawers for at least water and a smoking material, for example, wood chips. The sliding drawers may enable the maintenance of a stable smoking temperature and offer a safer means to replenish water and/or wood during the actual smoking operation. The multiple drawer embodiment allows a user to add wood and/or water without opening the smoking chamber.

Figure 1:
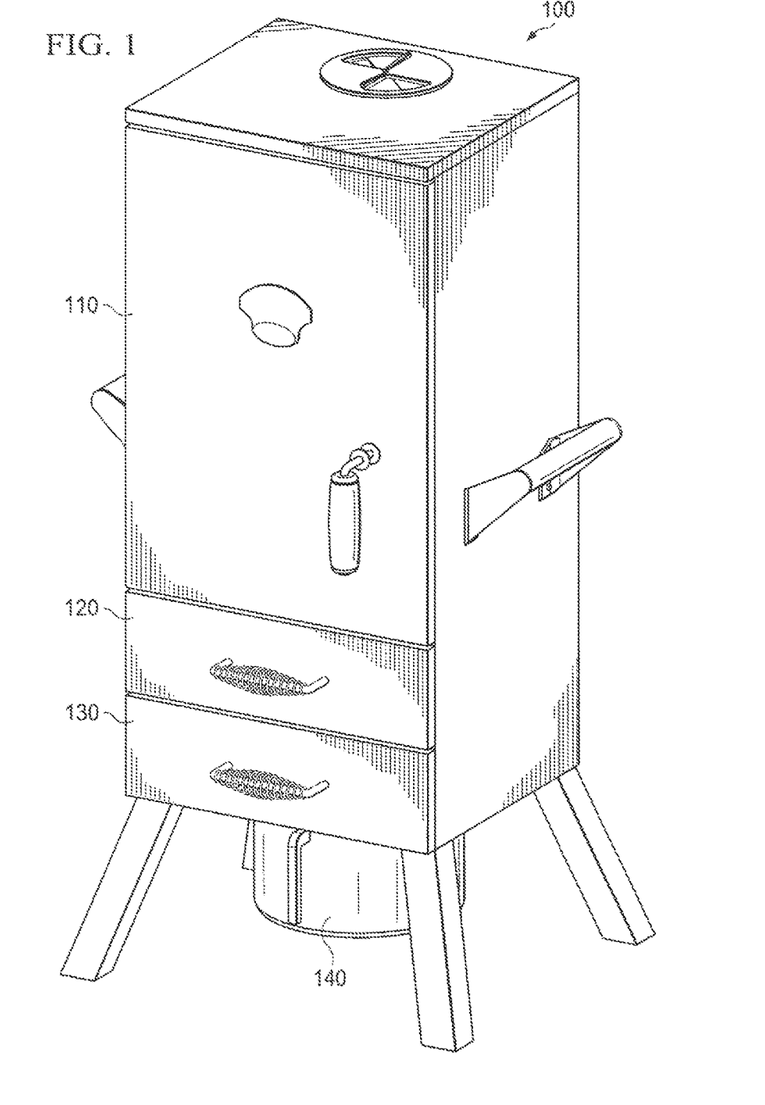
FIG. 1 is a system diagram of an example embodiment of a multiple drawer smoker.

An example embodiment of a multiple drawer smoker is provided in FIG. 1. Multiple drawer smoker 100 includes smoking chamber 110, first drawer 130, second drawer 120 and ash holder 140. Sliding drawers 120, 130 are located at the bottom of smoking chamber 110. First drawer 130 is located proximately below second drawer 120. Ash holder 140 may be located proximately below first drawer 130. First drawer 130 may include a heating means. Example embodiments of the heating means in first drawer 130 may include charcoal and/or wood as non-limiting examples. In operation, the heating means in drawer 130 in addition to charcoal, may contain smoking material, for example, but not limited to, wood chips. Example woods include mesquite, oak, beech, cherry, alder, walnut, chestnut, birch, hickory, and poplar, among others. Second drawer 120 may contain a water pan for holding water. A two drawer version of multiple drawer smoker 100 is provided in FIG. 1. However, more than two drawers may be implemented to achieve similar results.

In using the multiple drawer smoker 100, items to be smoked, such as meats, fish, nuts, cheese may be placed in smoking chamber 110. First drawer 130, may contain a charcoal pan with grate, which along with the wood will create the heat for the smoking function. Second drawer 120, located proximately above first drawer 130, holds water in a water pan to create the steam heat that mixes with the smoke. It is useful to maintain a consistent temperature in smoking chamber 110. The water in the water pan will eventually evaporate and the wood chips will burn. During normal, long-smoking operations, the water and wood in both drawers 120, 130 may be checked periodically to add more water to the water pan and/or more charcoal and wood chips. Multiple drawer system 100 provides a means to easily and safely change or add new materials to the contents of drawers 120 and 130. This allows the smoking materials to be changed without disturbing the smoke content or the temperature of smoking chamber 110. Having multiple drawers 120, 130 allows for the changing of one item without removing another from smoker 100. It also allows a quicker change or addition of the smoking materials.

In multiple drawer smoker 100, drawers 120, 130 allow immediate access to either the wood chip box or the water pan without opening the complete front door. Opening the door may result in temporary loss of heat and smoke from smoking chamber 110. Opening either drawer 120 or 130, instead, may reduce the heat and smoke recovery time by allowing less heat and smoke to escape during wood chip box or water pan review.

Figure 2:
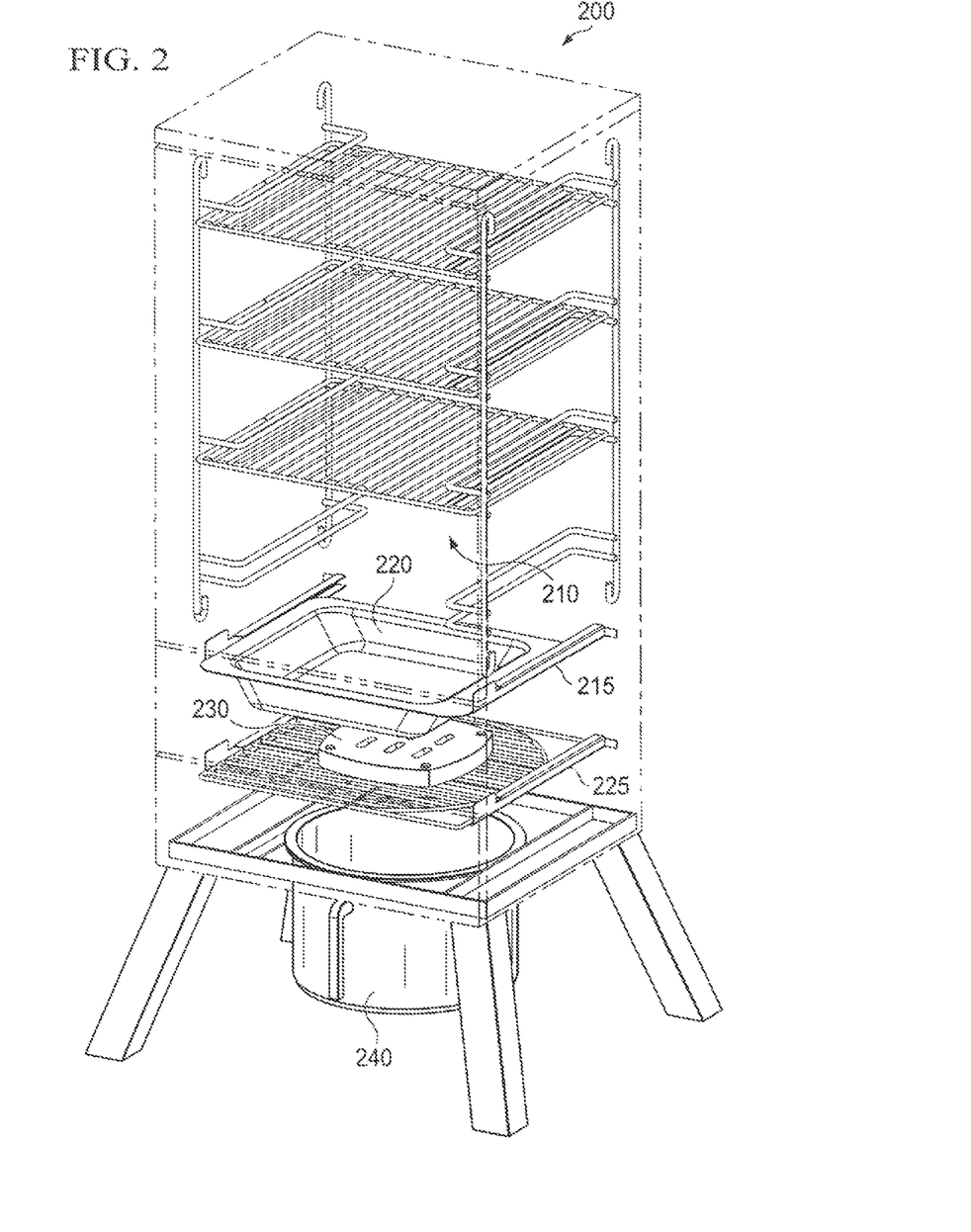
FIG. 2 is an exploded system diagram of an example embodiment of the multiple drawer smoker of FIG. 1.

In an example embodiment provided in FIG. 2, multiple drawer smoker 200 comprises smoking chamber 210 with water pan 220, wood chip box 230, and ash holder 240. The drawers holding water pan 220 and wood chip box 230 may be positioned on tracks 215 and 225 respectively that allow the drawers to extend out to the correct position, to stop, and/or to remain level. The drawer holding water pan 220 may remain level when opened so that no hot water splashes when the drawer is opened. Each drawer may have a built-in stop to prevent the drawer from prematurely detaching from tracks 215, 225 and the cooking chamber. There is no need for the user to touch the contents of either drawer during review, because the drawers safely hold chip box 230 and water pan 220 in place. If either chip box 230 or water pan 220 needs to be replenished, the replenishing may be performed without physically touching the hot box 230 or hot pan 220. In an example embodiment, multiple drawer smoker 200 allows either or both drawers to be extended out simultaneously without either interfering with the other.

Figure 3:
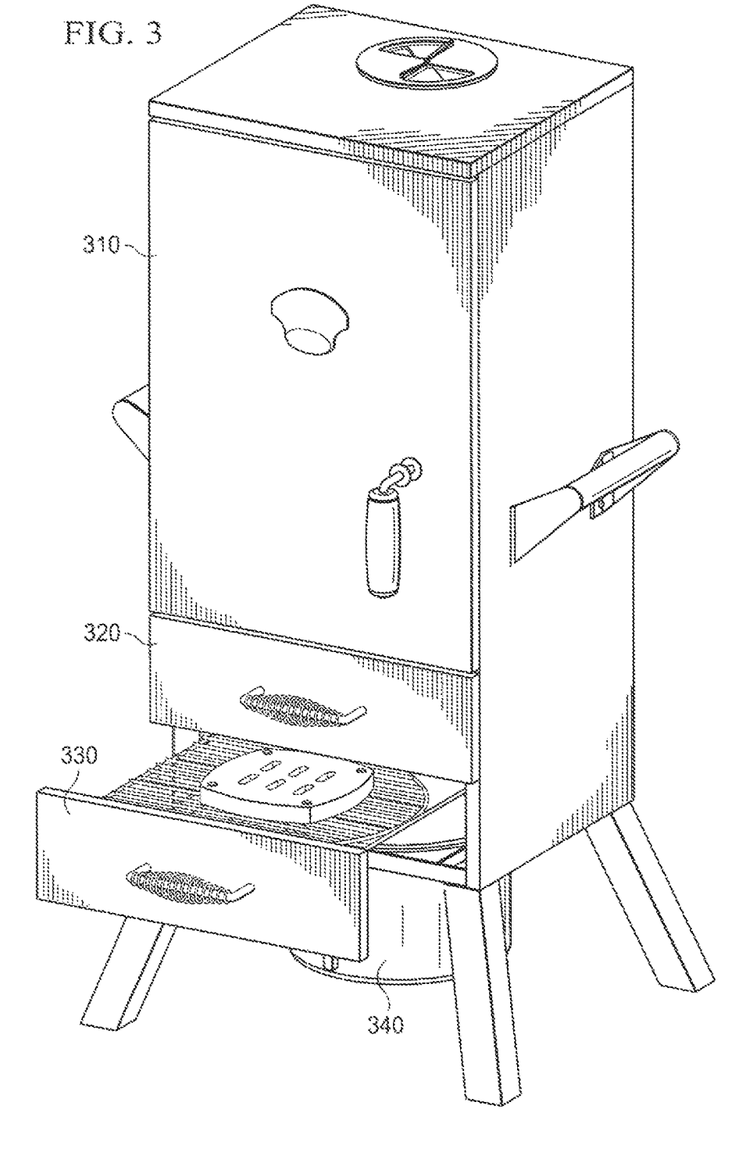
FIG. 3 is a system diagram of an example embodiment of the multiple drawer smoker of FIG. 1.

During smoking operation, as shown in FIG. 1, the doors and drawers of disclosed smoker 100 are normally in the closed position. As provided in FIG. 3, to check the wood chip status, wood chip drawer 330 may be opened for wood chip inspection. Wood may be added as desired. After the inspection and/or addition of wood, drawer 330 may be safely moved to the closed position. Water pan drawer 320 may remain closed while wood chip drawer 330 is opened. This two drawer system allows smoking chamber 310 to retain its heat and smoke. Similarly, to check the water pan, water pan drawer 320 may be opened and the water level may be inspected. Water may be added as desired and water pan drawer 320 may be safely returned to the closed position. A heating means in drawer 330 supplies the heat to produce the smoke. The heating means may comprise, as non-limiting examples, charcoal and/or wood, among others.

Figure 4:
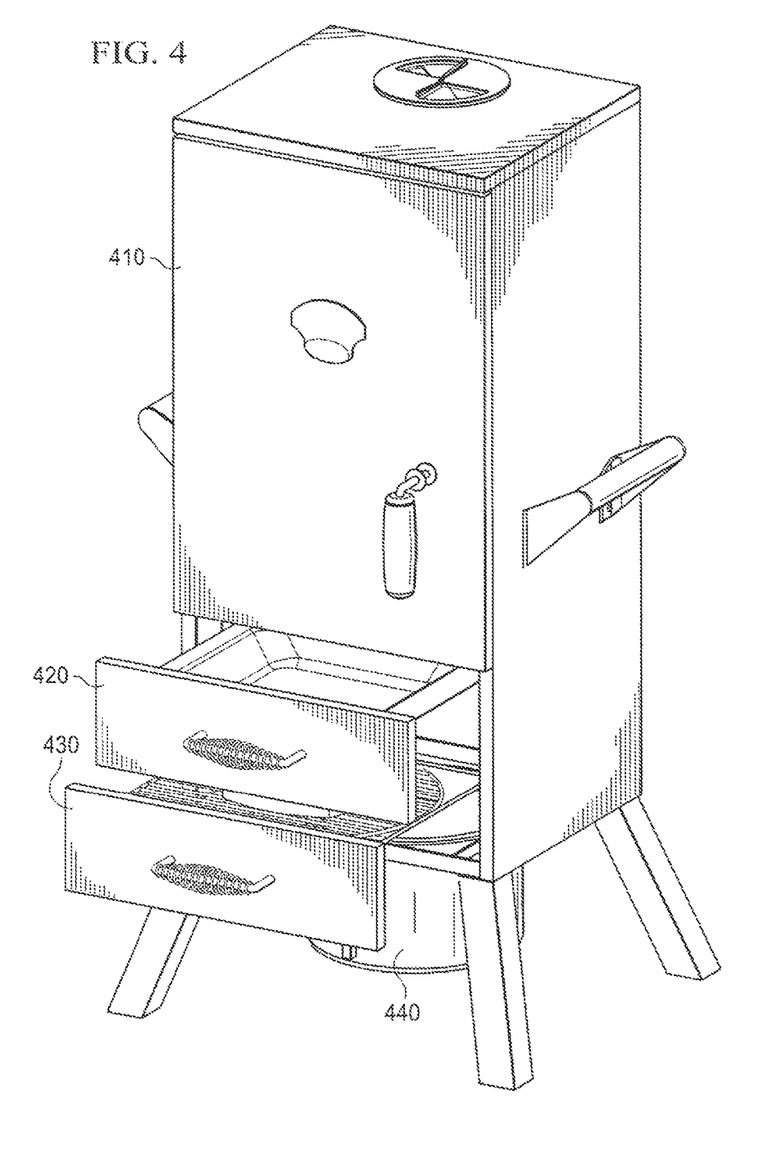
FIG. 4 is a system diagram of an example embodiment of the multiple drawer smoker of FIG. 1.

An alternative example embodiment of a multiple drawer smoker is provided in FIG. 4. The multiple drawer smoker includes smoking chamber 410, first drawer 430, second drawer 420 and ash holder 440. Sliding drawers 420 and 430 are located at the bottom of smoking chamber 410. First drawer 430 is located proximately below second drawer 420. Ash holder 440 may be located proximately below first drawer 430. Example embodiments of heating a means in drawer 430 may include charcoal and/or wood burning materials as non-limiting examples. In operation, the heating means in drawer 430 applies heat to the contents of second drawer 420. In an example embodiment, first drawer 430, in addition to charcoal may contain a water pan for holding water. First drawer 430 may contain smoking material, for example, but not limited to, wood chips. Example woods include mesquite, oak, beech, cherry, alder, walnut, chestnut, birch, hickory, and poplar, among others. A two drawer version of multiple drawer smoker 400 is provided in FIG. 4. However, more than two drawers may be implemented to achieve similar results.

In using the multiple drawer smoker 400, items to be smoked, such as meats, fish, nuts, cheese may be placed in smoking chamber 410. First drawer 430, proximately located above ash holder 440, may contain a wood chip box, which may hold the wood above the water for the smoking function. Second drawer 420, located proximately above first drawer 430, holds water in a water pan to create the steam heat that mixes with the smoke. It is useful to maintain a consistent temperature in smoking chamber 410. The water in the water pan will eventually evaporate and the wood chips will burn. During normal, long-smoking operations, the water and wood in both drawers 420, 430 may be checked periodically to add more water to the water pan and/or more wood chips. The multiple drawer system provides a means to easily and safely change or add new materials to the contents of drawers 420, 430. This allows the smoking materials to be changed without disturbing the smoke content or the temperature of smoking chamber 410. Having multiple drawers 420, 430 allows for the changing of one item without removing another. It also allows a quicker change or addition of the smoking materials.

In the multiple drawer smoker of FIG. 4, drawers 420, 430 allow immediate access to either the wood chip box or the water pan without opening the complete front door. Opening the door may result in temporary loss of heat and smoke from smoking chamber 410. Opening either drawer 420 or 430, instead, may reduce the heat and smoke recovery time by allowing less heat and smoke to escape during wood chip box or water pan review. In the multiple drawer smoker of FIG. 4, both drawers 420 and 430 of the multiple drawer smoker may be in an open position at the same time. This will still allow chamber 410 to retain the heat level provided by heating means 440.

Figure 5:
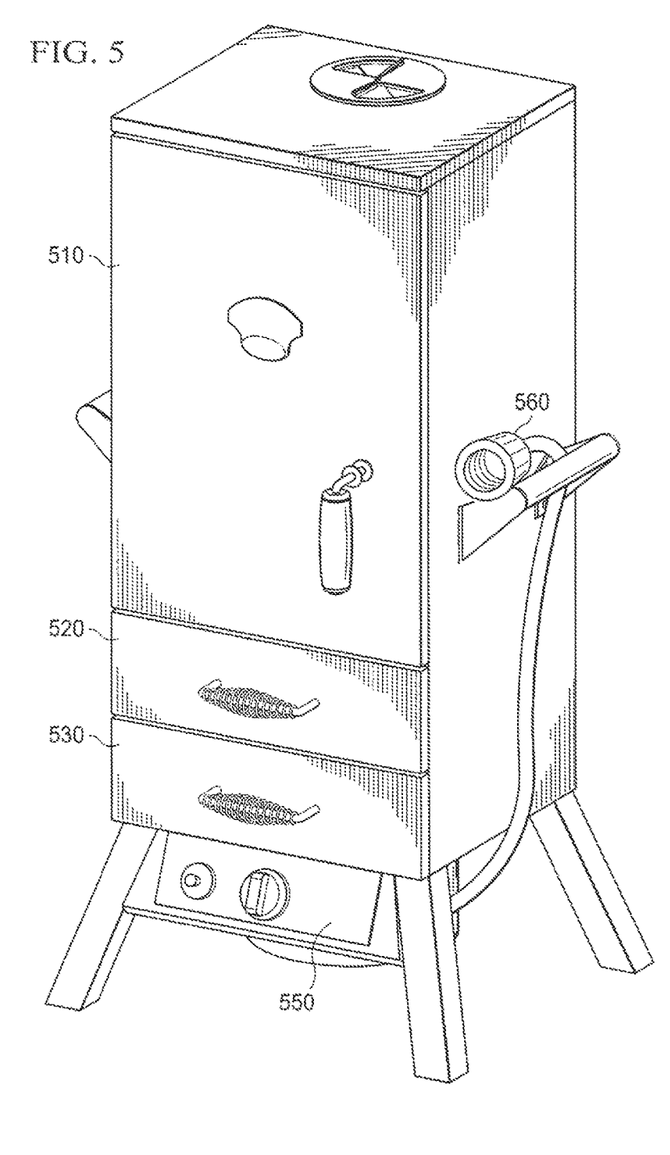
FIG. 5 is a system diagram of an example embodiment of the multiple drawer smoker of FIG. 1.

FIG. 5 provides an example embodiment of a multiple drawer smoker with smoking chamber 510, first drawer 530, second drawer 520, and heating means 550. Heating means 550 may be natural gas or liquid propane as non-limiting examples. Connector 560 may be used to connect to the source of the gas for heating means 550.

Figure 6:
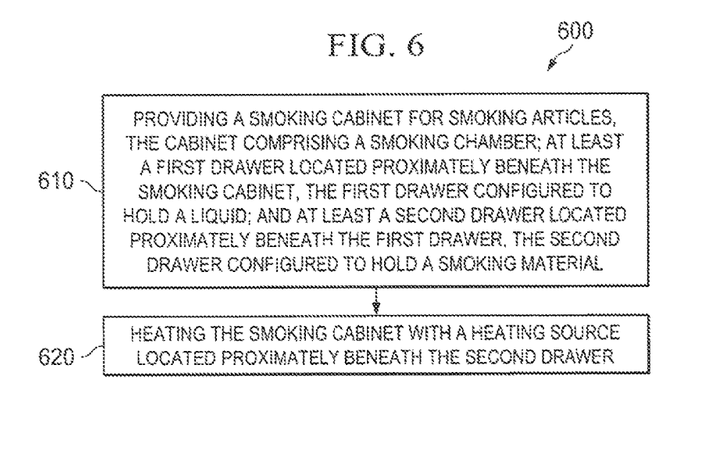
FIG. 6 is a flow diagram of a method of multiple drawer smoking.

FIG. 6 provides flow diagram 600 of a method of smoking. In block 610, a smoking cabinet for smoking articles is provided. The cabinet comprises a smoking chamber; at least a first drawer located proximately beneath the smoking chamber, the first drawer configured to hold a liquid; and at least a second drawer located proximately beneath the first drawer, the second drawer configured to hold a smoking material. In block 620 the smoking cabinet is heated with a heating source located proximately beneath the second drawer.

Figure 7:
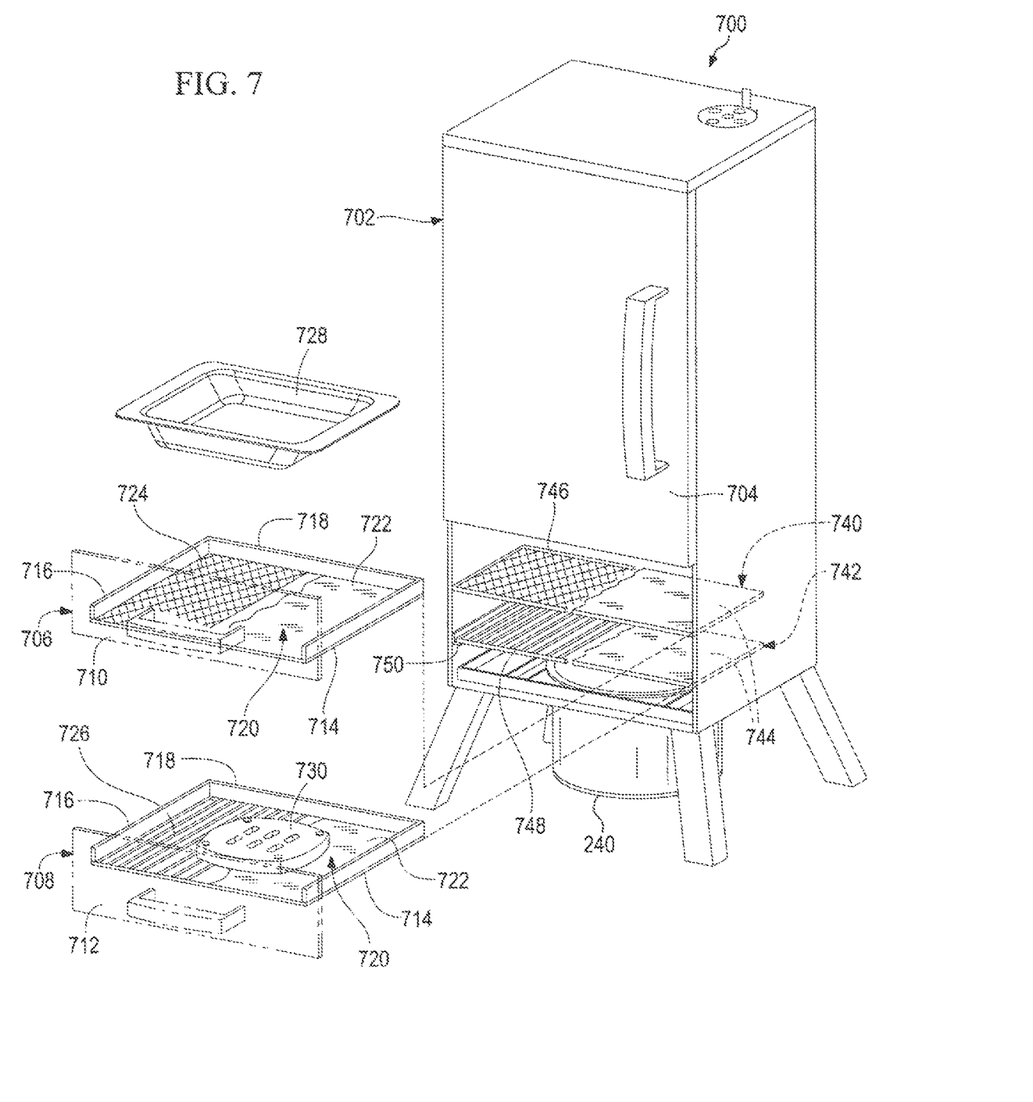
FIG. 7 is a partially exploded perspective view of several alternate embodiments of the present multiple drawer smoker.

Another embodiment of the present multiple drawer smoker is shown in FIG. 7. Similar to the previously described embodiments, smoker 700 includes a smoking chamber 702, accessed via door 704. The door is equipped with a magnetic, flexible seal around the inside perimeter thereof, in order to seal the smoking chamber and retain the heat and moisture used to cook the food placed therein.

At least two drawers are provided below the smoking chamber, here shown as upper drawer 706 and lower drawer 708. The drawers have front panels 710 and 712, respectively, each of which may be provided with seals, similar to the smoking chamber door. Each of the drawers have right and left side struts or panels 714 and 716, respectively, a rear strut or panel 718, and a base panel or floor 720, thereby creating the enclosure.

The floors of the drawers may have solid configuration, shown as 722, a perforated configuration 724, or a grate configuration 726. The floors may be constructed as all solid, all perforated, or all in grate form, or different types of surface can be combined, as in a partially solid side and a partially perforated side. The drawers may hold a water pan 728, a wood chip/smoking material holder 730, or some combination of the above. The drawers may also contain a fuel source, such as charcoal, a gas burner, or an electric element. Either of the drawers may contain the sources of heat, moisture, or smoking/flavoring material.

The drawers for smoker 700 are supported by supporting surfaces, such as shelves, upper shelf 740 and lower shelf 742. The shelves may be solid panels 744, perforated panels 746, or a grate-type panel 748, similar to the floors of the drawers. The drawers sit and slide directly on the shelves, obviating the need for supporting tracks and the attendant hardware. In an embodiment with solid shelves, either or both of the shelves may be reduced in length so as to leave an opening at the front or the back to allow passage of heat, smoke, moisture, etc. As with the floors of the drawers, the shelves can be completely solid, perforated, or have a grate design; or they may be partially solid, partially perforated or partially of a grate design, in any combination.

In an alternate embodiment, the supporting surfaces, such as shelves may be formed integrally with the sides of the smoker, projecting inwardly therefrom to provide support for the drawers. This design contemplates shelves that extend completely across the width or the depth of the smoker or that extend partially across the width or depth, thereby providing support and a passageway for heat, smoke, moisture, etc. A still further embodiment utilizes L-shaped rails 750 along the sides of the smoker, wherein the upright leg is secured to the inner wall of the smoker cabinet and the lateral leg of the bracket provides support for the drawers.

Two door units, such as Brinkman Model number 810-5502-W, offer access to the cooking chamber, in which the bottom door provides access to the water pan and wood chip box without opening the top door. At least one distinction between this two door system and the disclosed multiple drawer system is that the user of the two door system physically pulls the hot water pan or hot wood chip box out of the smoker in order to inspect and replenish the contents of the pan. The multiple drawer system allows the user to inspect and replenish either the water pan or the wood chip box, or both, without the user having to handle the hot water pan or hot chip box.

A single drawer unit, such as Charbroil Model number CB600X, offers access to the cooking chamber, in which the drawer provides access to the water pan and wood chip box without having to open the top door. At least one distinction between the single drawer and multiple drawer units is that with the single bottom drawer, both the water pan and wood chip box are removed when the single drawer is opened. To inspect and/or add water or wood chips, the hot water pan and/or wood chip box must be moved, causing a safety issue for the user. With the multiple drawer smoker, each drawer can be opened individually and does not require removal.

Although the smoker disclosed herein is described in a vertical smoker implementation, the disclosed system is also applicable to other smoker implementations, including but not limited to horizontal smokers (for example, barrel and square designs). The present invention has been described in detail; however, it should be understood that various changes, substitutions and alterations can be made thereto without departing from the spirit and scope of the invention as defined by the appended claims.

I claim:

1. A smoking apparatus comprising a cabinet having side and rear walls, an upper smoking chamber with a front access door and a lower section having at least two independently operable drawers, one of said drawers disposed above the other and each of said drawers having a front panel with right and left side panels forming an enclosure, a handle attached to each of said front panels, said handles located outside said cabinet, one of said drawers configured to hold a flavoring material and the second drawer configured to hold a liquid, a support surface for each of said drawers secured to said side walls of said lower section, whereby said drawers can be moved into and out of said cabinet using said handles, and a heating element disposed within said cabinet.

2. A smoking apparatus as defined in claim 1 in which said support surface comprises a solid shelf.

3. A smoking apparatus as defined in claim 1 in which said support surface comprises a perforated shelf.

4. A smoking apparatus as defined in claim 1 in which said support surface comprises a shelf having a solid portion and a perforated portion.

5. A smoking apparatus as defined in claim 1 in which said support surface comprises L-shaped rails secured to said side walls.

6. A smoking apparatus as defined in claim 1 in which at least one of said drawers has a solid bottom surface.

7. A smoking apparatus as defined in claim 1 in which at least one of said drawers has a perforated bottom surface.

8. A smoking apparatus as defined in claim 1 in which said support surface comprises a shelf having a solid portion and a perforated portion.

9. A smoking apparatus comprising a smoking cabinet having side and rear walls and having an upper smoking chamber with a front access door, at least two drawers located proximately beneath the smoking chamber, each of said drawers having a front panel with right and left side panels forming an enclosure and a handle attached to each of said front panels, said handles located outside said cabinet, a first drawer configured to hold a liquid and a second drawer configured to hold a flavoring material, each of said drawers being supported by an L-shaped support rail secured to each of said side walls, and in which said drawers are configured to be independently operable by moving the drawers along said support rails, whereby said drawers can be moved into and out of said cabinet using said handles, for introducing or replenishing material therein, and a heating element disposed within said cabinet.

10. The smoking apparatus as defined in claim 9 wherein the heating element is located external to the smoking cabinet.

11. The smoking apparatus as defined in claim 9 in which said drawers have a solid bottom surface.

12. The smoking apparatus as defined in claim 9 in which at least one of said drawers has a perforated bottom surface.

\* \* \* \* \*